United States Patent [19]

Kraemling et al.

[11] 4,164,107
[45] Aug. 14, 1979

[54] FIRE-PROOF WINDOW

[75] Inventors: Franz Kraemling, Aachen; Norbert Bartonitscheck, Stolberg; Günther Mattes, Richterich; Jakob Nieven, Aachen, all of Fed. Rep. of Germany

[73] Assignee: Saint-Gobain Industries, Neuilly-sur-Seine, France

[21] Appl. No.: 908,017

[22] Filed: May 22, 1978

[30] Foreign Application Priority Data

Oct. 14, 1977 [DE] Fed. Rep. of Germany ....... 2746243

[51] Int. Cl.² .......................... E04B 1/94; E04C 2/02
[52] U.S. Cl. ........................................ 52/232; 52/308; 52/573; 52/764; 52/476
[58] Field of Search ............... 52/1, 232, 573, 476, 52/308, 764–766; 428/428, 920, 921

[56] References Cited

U.S. PATENT DOCUMENTS

| | | | |
|---|---|---|---|
| 1,159,071 | 11/1915 | Murnane | 52/764 |
| 3,837,126 | 9/1974 | Voiturier | 52/232 |

FOREIGN PATENT DOCUMENTS

| | | | |
|---|---|---|---|
| 872111 | 3/1953 | Fed. Rep. of Germany | 52/764 |
| 851548 | 10/1953 | Fed. Rep. of Germany | 52/764 |
| 617644 | 2/1961 | Italy | 52/769 |
| 442692 | 1/1968 | Switzerland | 52/764 |
| 945894 | 1/1964 | United Kingdom | 52/766 |

*Primary Examiner*—James L. Ridgill, Jr.
*Attorney, Agent, or Firm*—Pennie & Edmonds

[57] ABSTRACT

This invention relates to a window with increased resistance to fire, consisting of at least one pane of glass, such as soda glass, mounted in a metal frame in such a way that during a fire the border and edge of the side exposed to the action of heat, or in some cases the borders and edges of both sides, are exposed to the heat.

15 Claims, 3 Drawing Figures

FIRE-PROOF WINDOW

BACKGROUND OF THE INVENTION

It has previously been proposed that the pane of soda glass should be covered, where it is held by the retaining strip, with a masking strip, specifically a metal listel, fastened to the glass or to the device that holds it by an adhesive that loses its adhesion when hot. A solder with a low melting point is an example of the kind of adhesive that might be used. Such a construction is disclosed in copending application "Fire-Proof Window", filed Dec. 5, 1977, Ser. No. 857,417, and assigned to the assignee of the present application.

The suggested application of masking strips or listels to the glass in the region of the device, such as a cushion frame, that holds it means that the window will look like a window of ordinary frame construction without impairment of its resistance to fire to any extent. The exposed borders of the pane of glass are thus masked and only uncovered in the event of a fire. The use of such listels is appealing on both aesthetic and practical grounds, especially when the devices that hold the pane of glass in the frame are made of a perforated cushion frame.

SUMMARY OF THE PRESENT INVENTION

According to the teachings of the present invention, the pane of soda glass is masked in the region of the cushion frame by a length of listel which is secured by a clip-on or snap type of connection. The parts thereof are made of a material that softens when heated. A steel ejection spring means is mounted between the listel and the frame.

According to a preferred embodiment of the invention which may be readily incorporated at the time of manufacture and assembly of the window unit and which is particularly well adapted to practical requirements, the frame of the window unit is masked with a listel fastened through a snap pinching connection. The connection is maintained under normal conditions by locking components consisting of a material which softens under the effect of heat. A member under stress, such as spring, is disposed between the listel and frame to aid in ejecting the listel when actuated. Advantageously, the locking components are made of a synthetic material, such as a thermoplastic material, which gives way at temperatures somewhat higher than 100° C. so that the spring may expand and separate the pinching members. The ejection force is determined as a function of the shape and the size of the locking components as well as of the material comprising them so that the locking effect predominates under ordinary conditions of temperature while the forces due to the pressure of the springs predominate as soon as the temperature rises sufficiently. Under the effect of the heat from a fire, the snap connection is freed as a result of the softening of the locking components and the covering strip is ejected under the effect of the force of the springs.

The snap connection may conveniently include clip-like parts like those commonly found on contemporary moldings. The structural section that serves as a listel may have flanges provided with projections, for instance, that snap into holders on the cushion frame.

In one embodiment of the invention, the flanges on the listel are made of a material that softens when heated. In this case the whole listel may conveniently be made of such a material, specifically of a thermoplastic material.

In another embodiment, the holders on the frame that receive the flanges on the listel and thus form part of the snap connection are themselves made of a material, specifically of a thermoplastic material, that softens when heated.

In a third embodiment, the parts of the snap connection that are made of a material that softens when heated are connectors that interlock both with the metal holders on the cushion frame and with the flanges on the metal listel that are provided with projections.

DETAILED DESCRIPTION OF THE PREFERRED EMBODIMENTS

The embodiments discussed here are asymmetrically designed windows that resist the action of flame and heat on one side while breaking relatively rapidly when the flames or heat come from the other side. Such an asymmetrical design is especially practical in facades, particularly in the facades of high-rise buildings, where it is necessary to resist the attack of flames on the outside of the window while freeing the window aperture when the flames strike from the inside. A symmetrical design is of course also possible when it is necessary or desirable for the window to resist the heat on both sides.

Figure 1:
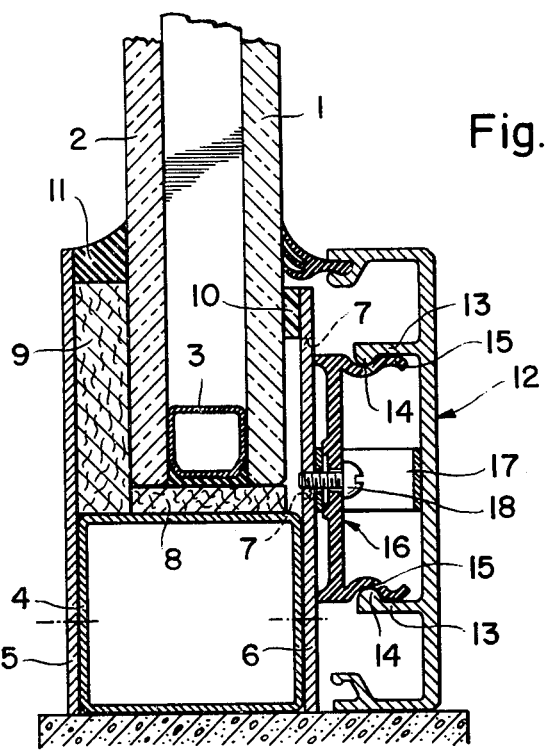
FIG. 1 is a cross-sectional view of a window with a clip-on type of listel having an ejection spring.

The window shown in FIG. 1 comprises two glass sheets 1, 2 made of hardened silicate (soda) glass, which are separated by an inset 3 and mounted in a frame. The frame consists of a rectangular tube 4 fastened into the splay of the wall. It forms a groove with a flat iron 5 arranged on the internal face of the window. A cushion frame 6 is placed on the external face. The latter is provided with openings 7, shown in detail in FIG. 2, thanks to which the edge of the glass sheet 1 is sufficiently heated in order to avoid the appearance of temperature gradients in its marginal region which might cause its destruction.

A heat insulating strip 8 consisting, for example, of asbestos, is placed between the edge of the pane and frame 4. Similarly, an insulating strip 9 runs between the groove formed by flat iron 5 and glass sheet 2 and another insulating strip 10 runs between sheet 1 and the upper part of perforated cushion frame 6. The insulating strip 9 is covered along its rim with a layer of mastic 11. The insulating strip 10 can advantageously consist of a material which softens under the effect of heat and gives way when the window is deformed under the effect of fire. Materials such as alkaline silicates which foam under the effect of heat are useful for this purpose.

The listel 12 according to the invention consists of a U-shaped section with tabs 13 arranged between the two end flanges. The tabs 13 are provided with bosses 14 which penetrate into a corresponding groove of flanges 15 of a retaining part or holder 16. The latter consists of short lengths of sections made of a thermoplastic material. Alternatively, the listel itself, or at least the tabs thereof, can be made of the thermoplastic material and the retaining parts made of metal.

Leaf springs 17 are fastened at the same time as the retaining parts are connected to the cushion frame 6 with screws 18. As a result, the clipping of the retaining parts to the listels 12 yields under the effect of the spring at a temperature slightly higher than 100° C. so that they then cease to fulfill their function and release the listel.

Figure 2:
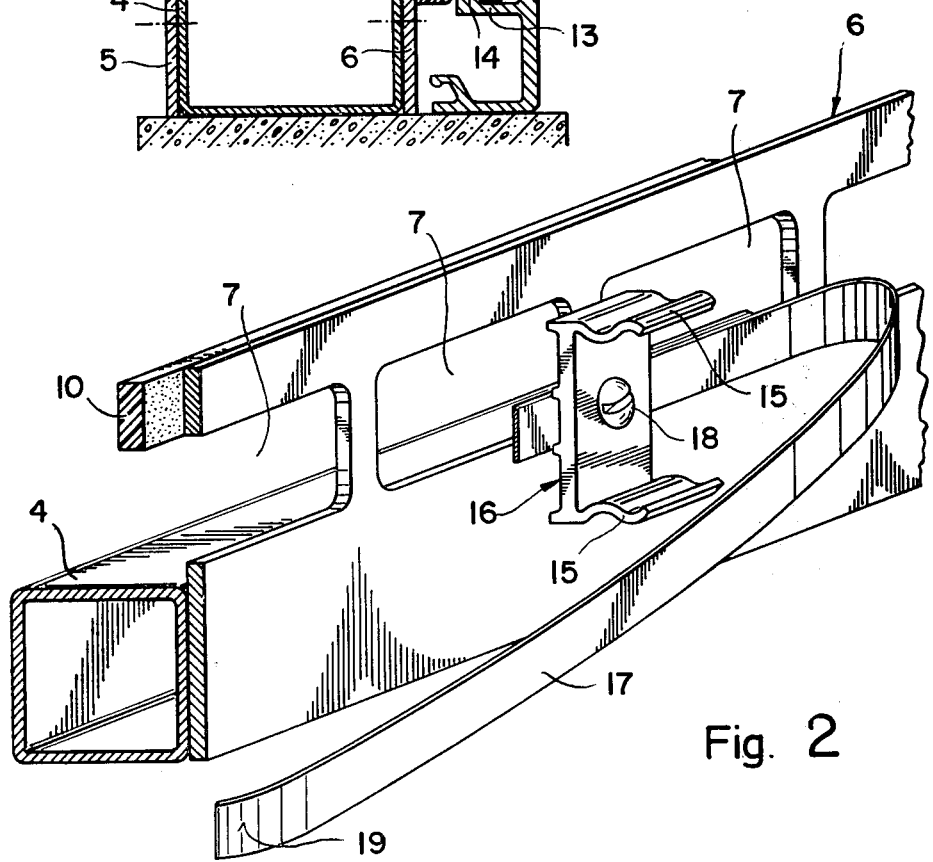
FIG. 2 is a partial perspective view of the frame of FIG. 1 before the connection of the listel.

Spring 17, as shown in FIG. 2, can be fastened at only one end to the retaining part. If, in addition, its opposite end 19 is fastened to listel 12, the latter, after having escaped the retaining part, will remain attached to the cushion frame 6 through its connection by the spring 17. This will keep the listel from falling but permit it to move a sufficient distance from its initial position to completely expose openings 7.

Figure 3:
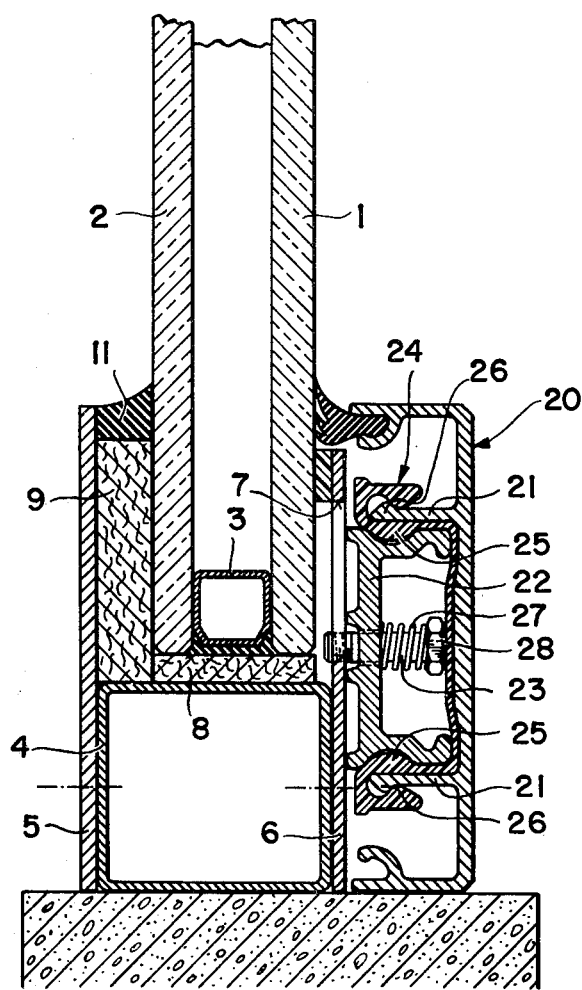
FIG. 3 is a cross-sectional view showing a varying embodiment of the construction of FIG. 1.

FIG. 3 shows another method of covering a perforated cushion frame 6. Listel 20 in this case is again provided with two tabs 21 turned inwardly in order to be fastened through pinching to metallic retaining parts 22 fastened by screws 23 to the cushion frame 6. The tabs 21 do not penetrate directly into the corresponding depressions of the retaining parts 22. Instead, a thermoplastic seal 24 with a U-shaped section is interposed between the tabs and the flanges of the retaining parts. The seal has an extra thickness 25 which penetrates into a depression in each retaining part 22. A return lip on the seal imprisons the boss 26 of tabs 21. A clipping is thus obtained between the two metallic components through the thermoplastic seal. When the latter softens, listel 20 is ejected by the force exerted from the inside. This force can be exerted by a spring such as the one described in relation to FIGS. 1 and 2.

It is also possible, as shown in FIG. 3, to use a spiral spring 27 placed around the rod of the screw 23 which is metallic and which serves to fasten the retaining part 22 onto the cushion frame. The spring 27 is maintained compressed under normal circumstances through a safety member such as a nut 28 made of a thermoplastic material thus preventing seal 24 from being ejected. When nut 28 yields under the effect of heat, the force resulting from the pressure of spring 27 is exerted on listel 20; and since the seal 24 softens simultaneously, the listel is ejected thus exposing the perforated cushion frame 6. The same result can be obtained by using a metallic nut associated this time with a screw 23 made of thermoplastic material. Finally, screw 23 and nut 28 can both consist of thermoplastic materials and it is even possible to use other fastening means based on the same principle. For example, the safety member may be constructed of metallic parts joined by a soft soldering which melts under the effect of heat.

We claim:

1. In a fire-resistant window having at least one glass sheet mounted in a main frame disposed about the peripheral edge of the glass sheet with the edge region of the sheet on the side thereof to be exposed to the heating effect of fire being at least partially exposed and free of frame structure, the improvement comprising:
    (a) cushion frame means disposed over said edge region and connected to said main frame and having openings therethrough exposing the edge region of the sheet;
    (b) listel means disposed over said cushion frame means and covering said openings;
    (c) connection means for attaching said listel means to said cushion frame means, said connection means being disposed between said cushion frame means and said listel means; and being responsive to the heat of fire to soften and lose its attaching function; and
    (d) ejection means disposed between said listel means and cushion frame means for detaching and removing said listel means from said cushion frame means when said connection means loses its attaching function.

2. A window according to claim 1 wherein:
    (a) the connection means includes holders having extending flanges with grooves therein; and
    (b) the listel means includes tabs with bosses thereon facing the flanges of said holders for cooperating with the grooves therein to effect attachment of the listel means.

3. A window according to claim 2 wherein:
    (a) wherein at least one of the holders and the tabs of the listel are constructed of material which softens under the effects of heat to release said listel means.

4. A window according to claim 2 wherein:
    (a) the holders are short lengths of section fixed to the cushion frame and disposed at spaced intervals along the peripheral edge of the glass sheet; and
    (b) the tabs of the listel means extend over the entire length thereof.

5. A window according to claim 3 wherein:
    (a) the ejection means consists of a member placed under stress between the cushion frame means and listel means.

6. A window according to claim 5 wherein:
    (a) the ejection means is a leaf spring.

7. A window according to claim 6 wherein:
    (a) the leaf spring is fastened at one end to the cushion frame means and at its other end to the listel means.

8. A window according to claim 1 wherein:
    (a) the connection means includes holders having extending flanges with grooves therein;
    (b) the listel means includes tabs with bosses thereon aligned with the flanges of the holders but facing away therefrom; and
    (c) said connection means further includes a separate locking means disposed between the flanges of the holders and the tabs of the listel means and having an enlarged section fitting within the grooves and a return lip section cooperating with the bosses on the tabs to effect attachment of the listel means.

9. A window according to claim 8 wherein:
    (a) the locking means is constructed of material which softens under the effect of heat to release said listel means.

10. A window according to claim 9 wherein:
    (a) the locking means is constructed of thermoplastic material.

11. A window according to claim 10 wherein:
    (a) the ejection means is a spiral spring.

12. A window according to claim 11 further comprising:
    (a) a safety means normally immobilizing the spring, said safety means being constructed, at least in part, of a material which softens under the effect of heat to release the spring.

13. A window according to claim 12 wherein:
    (a) the safety means comprises two parts which are kept assembled through a soft solder.

14. A window according to claim 12 wherein:
    (a) the safety means comprises a screw and a nut which immobilize the spring and at least one of which softens under the effect of heat.

15. A window according to claim 14 wherein:
    (a) at least one of the two parts comprising a screw and a nut is a thermoplastic material.

* * * * *